(12) United States Patent
Lin (10) Patent No.: US 12,524,230 B2
(45) Date of Patent: Jan. 13, 2026

(54) SEMI-OPEN SOURCE CONTROL SYSTEM FOR UNMANNED AERIAL VEHCLES (UAVs) AND DESIGN METHOD THEREOF

(71) Applicant: National Formosa University, Yun-Lin Hsien (TW)

(72) Inventor: Huan-Jung Lin, Yun-Lin Hsien (TW)

(73) Assignee: NATIONAL FORMOSA UNIVERSITY, Yun-Lin Hsien (TW)

( * ) Notice: Subject to any disclaimer, the term of this patent is extended or adjusted under 35 U.S.C. 154(b) by 258 days.

(21) Appl. No.: 18/529,659

(22) Filed: Dec. 5, 2023

(65) Prior Publication Data
US 2025/0182632 A1 Jun. 5, 2025

(51) Int. Cl.
| | |
|---|---|
| G06F 8/71 | (2018.01) |
| G08G 5/26 | (2025.01) |
| G08G 5/30 | (2025.01) |
| G08G 5/55 | (2025.01) |
| G08G 5/57 | (2025.01) |

(52) U.S. Cl.
CPC .......... G06F 8/71 (2013.01); G08G 5/26 (2025.01); G08G 5/30 (2025.01); G08G 5/55 (2025.01); G08G 5/57 (2025.01)

(58) Field of Classification Search
None
See application file for complete search history.

(56) References Cited

U.S. PATENT DOCUMENTS

| | | | |
|---|---|---|---|
| 2005/0004723 A1* | 1/2005 | Duggan | G05D 1/0061 701/13 |
| 2013/0345920 A1* | 12/2013 | Duggan | B64C 19/00 701/23 |
| 2015/0142211 A1* | 5/2015 | Shehata | G08G 5/57 701/2 |
| 2017/0069214 A1* | 3/2017 | Dupray | G08G 5/56 |
| 2017/0285631 A1* | 10/2017 | Bethke | G05D 1/222 |
| 2017/0371353 A1* | 12/2017 | Millinger, III | G06T 7/246 |
| 2019/0317530 A1* | 10/2019 | Yang | G08G 5/74 |
| 2020/0019189 A1* | 1/2020 | Chen | G08G 5/32 |
| 2020/0020236 A1* | 1/2020 | Zhou | G08G 5/55 |
| 2021/0116943 A1* | 4/2021 | Wang | G05D 1/0094 |
| 2021/0155344 A1* | 5/2021 | Mura Yañez | E04B 1/35 |
| 2021/0263537 A1* | 8/2021 | Belt | G08G 5/32 |
| 2021/0264799 A1* | 8/2021 | Belt | B64F 1/005 |

* cited by examiner

Primary Examiner — Qing Chen
(74) Attorney, Agent, or Firm — WPAT, PC (57) ABSTRACT

The invention discloses a semi-open source control system for unmanned aerial vehicles (UAVs) and a design method thereof. A main processing core of a single-chip multi-core processor is built with a semi-open source flight control module configured to control the UAV. The semi-open source flight control module includes a closed source control function module and an open source control program module. The closed source control function module enables the semi-open source flight control module to perform power management, ground communication, aviation sensing, flight control, navigation calculation, and flight record information processing of the UAV. A secondary processing core of the single-chip multi-core processor is built with user application programs enabling users to program working task application programs according to their required tasks, and the working task application programs are composed with the open source control program module through a shared register.

11 Claims, 4 Drawing Sheets

SEMI-OPEN SOURCE CONTROL SYSTEM FOR UNMANNED AERIAL VEHICLES (UAVs) AND DESIGN METHOD THEREOF

FIELD OF THE INVENTION

The present invention relates to a semi-open source control system for unmanned aerial vehicles (UAVs) and a design method thereof, especially to a semi-open source control technology which is built with an autopilot program in a main processing core and equipped with shared registers sharing flight status and waypoints of the UAV for users to develop UAV flight control application programs outside the main processing core.

BACKGROUND OF THE INVENTION

The concept of open source was first applied to software (like Linux). As development of open source software gradually composed with hardware, open source hardware has emerged. Open source hardware must be approved and authorized by the original designer before being produced (e.g. Pixhawk v3, Holybro Pixhawk 6C, etc. manufactured by CUAV Tech Inc.) and none of the trademarks owned by the original designer were used. The source code of hardware also needs to be open and accessible to others for modifications to achieve technical freedom and to provide knowledge sharing. With the development of Linux and git, mature open source collaboration platforms such as github and gitbook have been brought to the UAV industry, which have organized the scattered development resources of the software and hardware for UAVs, allowing developers and users to quickly implement development of the flight control systems, and, therefore, the sharing mechanisms of the open source platforms promote the rapid commercialization of the UAV industry, thereby promoting the overall development of the UAV industry.

Furthermore, the open source flight control system of UAV is mainly used to control the UAV to meet the requirements of autopilot, in order to achieve the purpose of performing specific required tasks. As we know, there are two major communities for the open source flight control system of UAV as followings: (a) Ardupilot is based on the Arduino open source platform, Chris Anderson established DIYDrones.com in 2007 and launched flight control hardware and its flight control software APM (https://ardupilot.org/), wherein the 8-bit Mage2560 from the microchip AVR series is used as the processor while it doesn't have the configuration of a task computer, however, if the configuration of the task computer is required, additional hardware needs to be added which might cause a relatively high cost for the hardware construction; and (b) Pixhawk uses ST's 32-bit single-core STM32 processor, its open source flight control software is PX4 (https://pixhawk.org/), which is a high-performance flight control hardware board launched by Zurich University of Technology in 2013 (Designed by Lorenz Meier), while it doesn't have the configuration of a task computer or an AI computing computer, if task computer or AI computing computer needs to be configured, adding hardware by connected with an external system is required which might cause a relatively high cost of hardware construction, or weight, volume and power consumption increasing which reduces airborne time of the aircraft.

As we known, Skynode is a product reshaping the UAV technology of Pixhawk in 2020 which comprises a STM32F7 flight control board, an ARM Cortex-A53 quad-core (13,800DMIPS) mission motherboard and a LTE communication module inside, however, since its mission computer configuration is ARMCortex-A53 quad-core board plus Auterion OS (composed of 3 boards), the hardware construction cost is relatively high.

Obviously, the well-known open source flight control technology mentioned above is indeed not perfect in terms of functional construction, and there is still a need for further improvement. In view of this, how to develop semi-open source control technologies for UAVs by using multi-core chip as the computing core for autopilot and providing shared registers sharing data of flight status and waypoints for users to develop their required user application programs on other cores of chip has become a technical issue that industry and academia researchers in related technical fields are eager to challenge and solve. Hence, after continuous efforts in research and development, the inventor of the present invention has a development to solve those problems and disadvantages of prior arts mentioned above.

SUMMARY OF THE INVENTION

The first purpose of the present invention is to provide a semi-open source control system for UAVs, which mainly uses a single-chip multi-core processor as the computing core for autopilot of UAVs, builds the autopilot program in a main processing core, and supplies at least one shared register storing and sharing flight status and waypoints of UAVs for users to use as navigation, AI application and compution when developing UAV flight control application programs required in other cores of the chip, so as to achieve the aims of increasing the stability of system software and hardware, reducing space and weight, and reducing current consumption and cost, etc., The technical means to achieve the first purpose of the present invention is to construct a single-chip multi-core processor and at least one shared register on the UAV. The main processing core of the single-chip multi-core processor is built with a semi-open source flight control module configured to control UAVs. The semi-open source control module is built with a matched set of a closed source control function module and an open source control program module. The closed source control function module comprises a data processing function module, a communication function module, a flight control function module and a hardware setting function module enabling the semi-open source flight control module to perform the UAV's power management, ground communications, aviation sensing, flight control, navigation calculations and flight record information processing. At least one secondary processing core of the chip comprises at least one first user application program for users, according to their required tasks, to program at least one working task application program, so that the at least one working task application program are capable to be composed with the closed-source flight control program module through the shared register to form at least one UAV flight control application program which enables the semi-open source flight control module to control the flight of the UAV according to the at least one required task.

The second purpose of the present invention is to provide a design method for a semi-open source control system for UAVs. The main technology is to design the autopilot system of UAV built with a matched set of a closed source control function module and an open source control program module to be a semi-open source flight control module. The closed source control function module is protected by multiple function, the open source control program module is open to users to develop user application programs for required flight tasks of UAV, so as to easily achieve the purpose of customized programming and reducing the burden of designing autopilot programs for users. The technical means to achieve the second purpose of the present invention comprises steps of: constructing a single-chip multi-core processor and at least one shared register on the UAV, the single-chip multi-core processor comprising a main processing core and at least one secondary processing core; building a semi-open source flight control module in the main processing core configured to control the UAV; building a closed source control function module and an open source control program module in the semi-open source flight control module; building a data processing function module, a communication function module, a flight control function module and a hardware setting function module in the closed source control function module, enabling the semi-open source flight control module to perform power management, ground communication, aviation sensing, flight control, navigation calculation and information processing of flight records of the UAV; and building at least one user application program in the at least one secondary processing core correspondingly, and the at least one user application program enabling a user, according to at least one required task, to program at least one working task application program which is composed with the open source control program module through the shared register to form at least one UAV flight control application program; the at least one UAV flight control application program enabling the semi-open source flight control module to control the flight of the UAV according to the at least one required task.

DETAILED DESCRIPTION OF THE PREFERRED EMBODIMENT

To allow the examiner to further understand the overall technical characteristics of the present invention and the technical means to achieve the purpose of the present invention, specific embodiments are described in detail with reference to the drawings.

Figure 1:
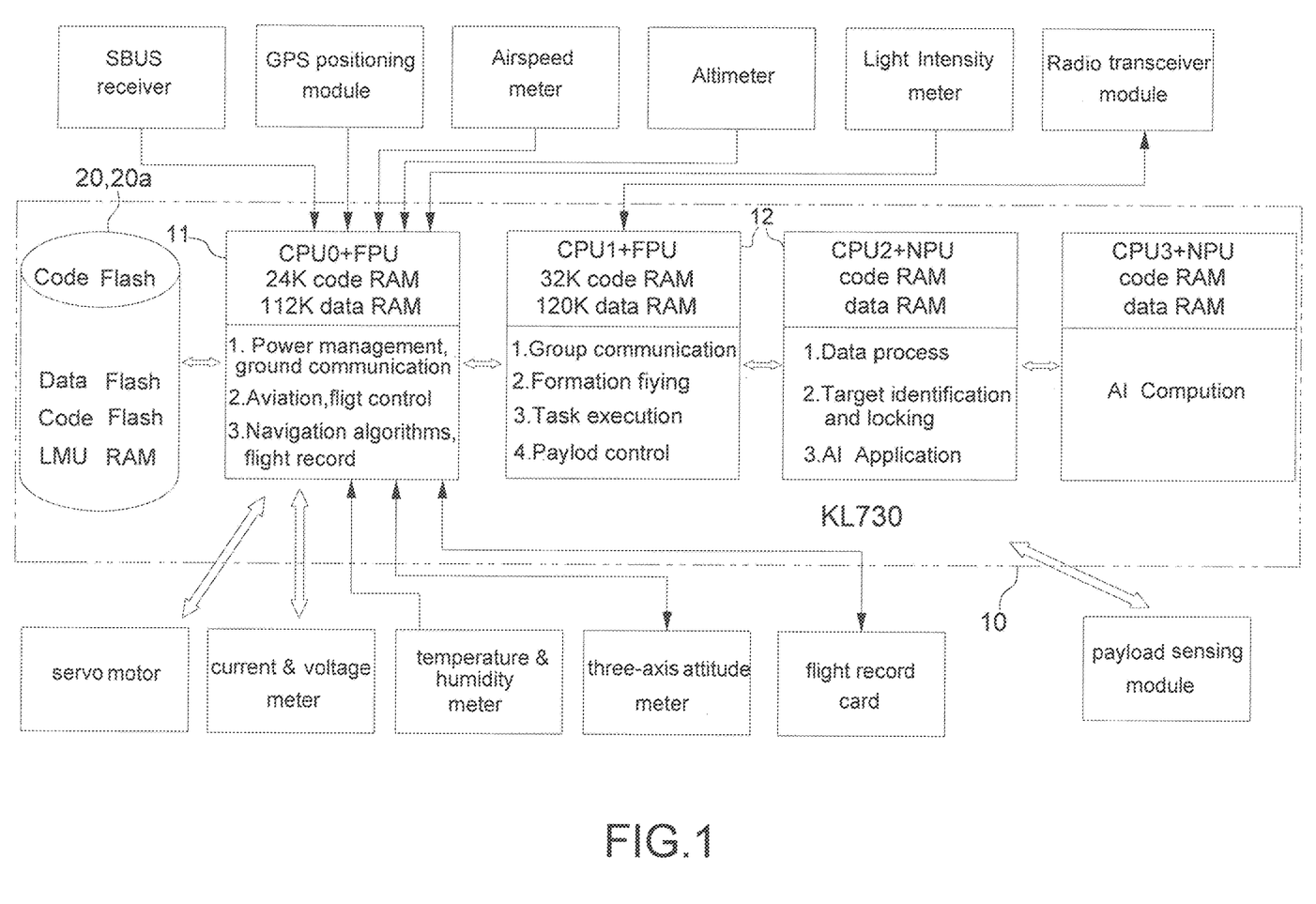
FIG. 1 is a schematic diagram of one embodiment of the autopilot system in accordance with the present invention.
Figure 4:
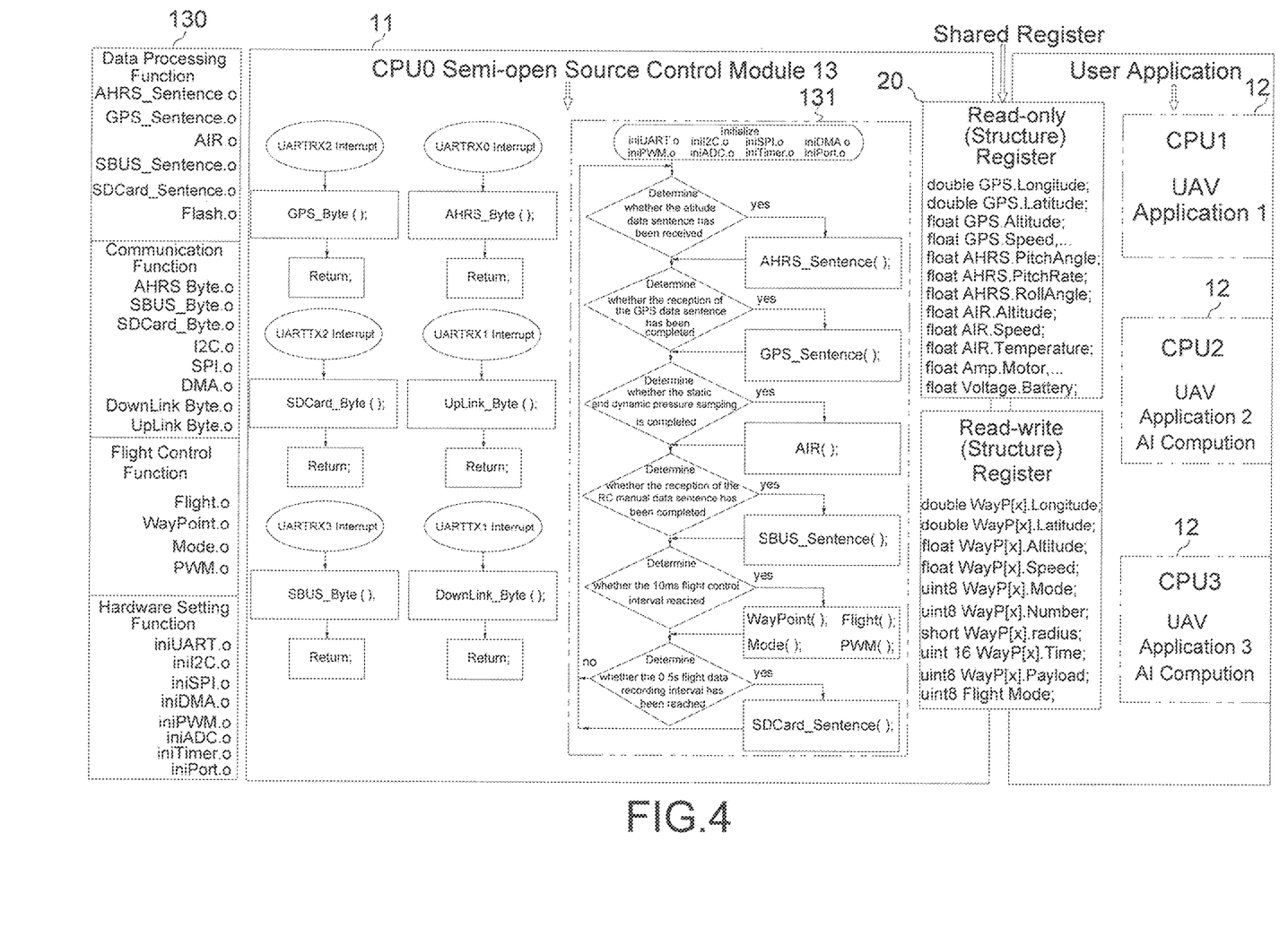
FIG. 4 is a schematic diagram of the semi-open source control system in accordance with the present invention.

Referring to FIGS. 1 and 4, in order to achieve the first purpose of the present invention, one embodiment mainly constructs a single-chip multi-core processor 10 and at least one shared register 20 on a UAV. The single-chip multi-core processor 10 at least comprises a main processing core 11 and at least one secondary processing core 12. Wherein, the main processing core 11 is built with a semi-open source flight control module 13 for controlling the UAV. The semi-open source flight control module 13 is built with a matched set of a closed source control function module 130 and an open source control program module 131, and the closed source control function module 130 at least or at most comprises a data processing function module, a communication function module, a flight control function module and a hardware setting function module, so that the semi-open source flight control module 13 is capable to perform the power management (such as managing the discharge mode and power consumption of the battery pack), ground communications (radio transceiver module shown in FIG. 1), aviation sensing (GPS positioning module, airspeed meter, altimeter, light intensity meter, current and voltage meter, temperature and humidity meter, three-axis attitude meter, etc. shown in FIG. 1), flight control (servo motor shown in FIG. 1), navigation calculation and information processing of the flight record (flight record card shown in FIG. 1) of the UAV. The at least one secondary processing core 12 comprises at least one user application program which enables the user to program at least one working task application program according to the required tasks, so that the working task application program are capable to be composed with the open source control program module 131 through the shared register 20 to form at least one UAV flight control application program, thereby enabling the at least one UAV flight control application program capably to activate the semi-open source flight control module 13 to control the UAV.

Referring to FIG. 1, one embodiment of the present invention, the registers or memories are set with register data areas which are applied by the user application program as data accessing while the user application program is executed. A plurality of shared registers 20 or memories 20*a* is constructed on the UAV, which is configured to enable the single-chip multi-core processor 10 to be informationally linked with the main processing core 11 and the at least one secondary processing core 12. The plurality of shared registers 20 or the memories 20*a* is configured as a plurality of temporary data storage areas for storing and sharing flight controls and commands of the UAV, and the plurality of temporary data storage areas are configured to be applied by the at least one user application program as data accessing while the at least one user application program is executed. Specifically, the plurality of shared registers 20 or memories 20*a* comprise a plurality of read-only memories and a plurality of read-write memories, and the plurality of read-only memories comprise a GPS longitude temporary data storage area, a GPS latitude temporary data storage area, a GPS altitude temporary data storage area, a GPS speed temporary data storage area, attitude angle and angular velocity temporary data storage areas, an air pressure high temporary data storage area, temperature and airspeed temporary data storage areas, battery voltage and circuit current temporary data storage areas, and flight mode and waypoint information temporary data storage areas, as shown in FIG. 4.

Referring to FIG. 4, the data processing function module comprises at least one processing function for attitude data of attitude sensors (AHRS Sentence.o), at least one processing function for GPS data (GPS Sentence.o), at least one processing function for atmospheric measurement data (AIR.o), at least one processing function for RC remote control command data (SBUS Sentence.o), at least one processing function for generating and storing flight data (SD Card Sentence.o) and at least one processing function for write and read flash data (Flash.o). The communication function module comprises at least one processing function for byte reception and interrupt of attitude sensor (AHRS Byte.o), at least one processing function for byte reception and interrupt of RC remote control command (SBUS_Byte.o), at least one processing function for byte interrupt of flight data writing (SD Card_Byte.o), at least one processing function for byte reception and interrupt of I2C interface (I2C.o), at least one processing function for byte reception and interrupt of SPI interface byte (SPI.o), at least one processing function for DMA interrupt (DMA.o), at least one processing function for byte interrupt of communication download (DownLink Byte.o) and at least one processing function for byte interrupt of communication upload (UpLink Byte.o); and the flight control function module comprises at least one flight control function (Flight.o), at least one waypoint management function (WayPoint.o), at least one flight mode management function (Mode.o) and at least one processing function for converting control volume into server PWM signal (PWM.o). The hardware setting function module comprises at least one serial interface initialization function (iniUART.o), at least one I2C interface initialization function (iniI2C.o), a SPI interface initialization function (iniSPI.o), at least one direct memory access initialization function (iniDMA.o), at least one PWM output initialization function (iniPWM.o), at least one A/D conversion initialization function (iniADC.o), at least one timer (iniTimer.o) initialization function and at least one port pin initialization function (iniPort.o).

Referring to FIGS. 1 and 4, the number of the at least one secondary processing core is multiple to assist the users in developing multiple UAV flight control application programs for required tasks. The multiple secondary processing cores 12 are built with multiple user application program correspondingly which enable the user, according to their required tasks, to program multiple corresponding working task application programs which are composed with the open source control program module 131 to form multiple corresponding UAV flight control application programs through the shared register 20, so that the semi-open source flight control module is capable to control the flight of the UAV according to the user's required tasks correspondingly, therefore, so as to enable the multiple corresponding UAV flight control application programs to performs the corresponding multiple required tasks of executions, communications and coordination of group flights, one of the multiple UAV flight control application program performs the corresponding multiple required tasks of image capture and processing, and at least one of the other UAV flight control application program performs the corresponding multiple required tasks of payload control, data processing, and target identification, locking and tracking for AI application or AI compution.

Figure 2:
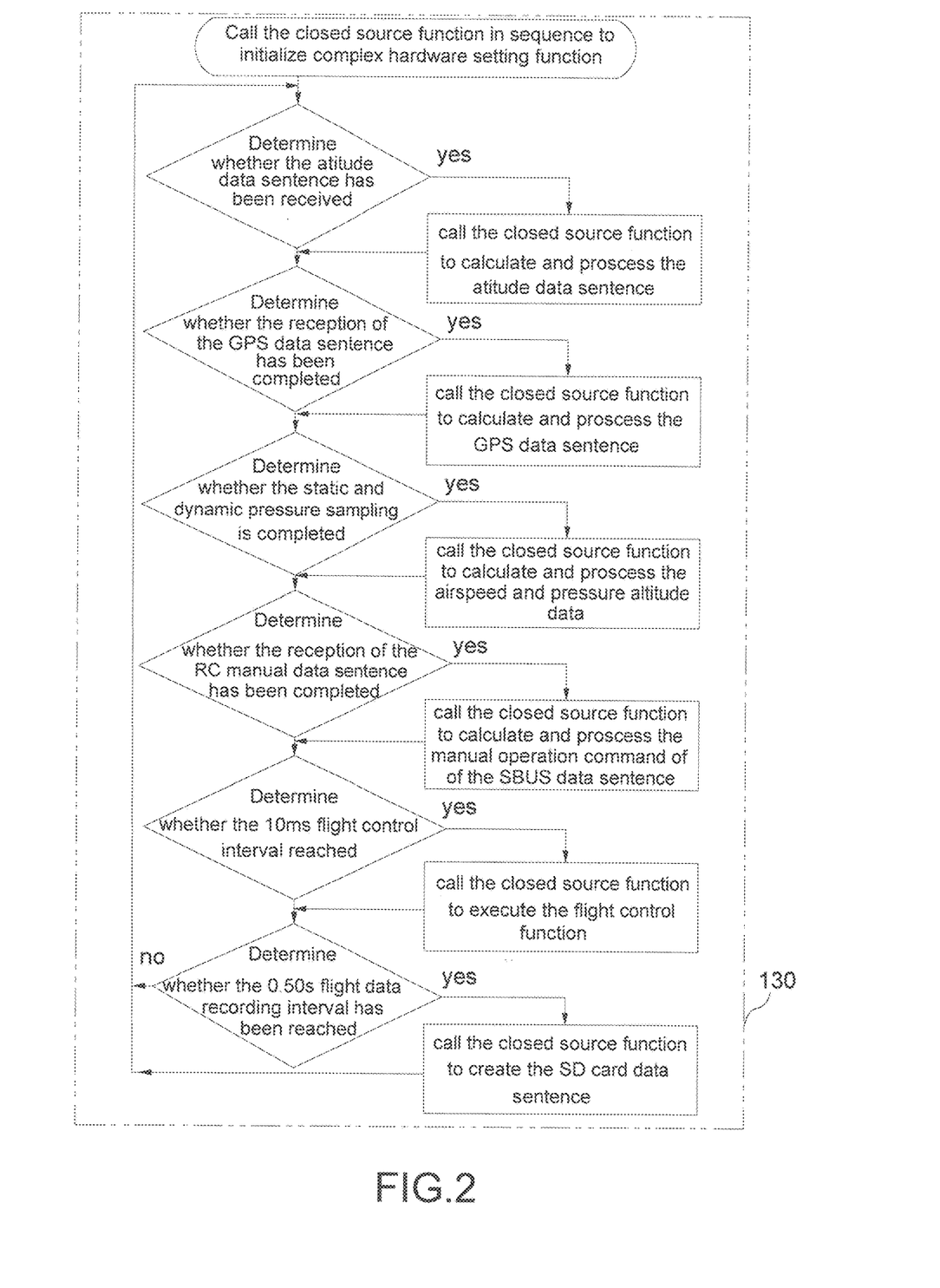
FIG. 2 is a schematic flow chart of the main program with further description in block of the open source and closed source control program modules in accordance with the present invention.

Referring to FIGS. 2 and 4, specifically defines the confirmation steps for sending and receiving real-time data when the open source control program module 131 is started. The execution of the open source control program module 131 of the semi-open source control module 13 comprises the following steps: step 1: call closed source functions in sequence to initialize complex hardware setting function module; step 2: determine whether the attitude data sentence has been received and, if so, call the closed source function to calculate and process the attitude data sentence; step 3: determine whether the reception of the GPS data sentence has been completed and, if so, call the closed source function to calculate and process the GPS data sentence; step 4: determine whether the static and dynamic pressure sampling is completed and, if so, call the closed source function to calculate and process the airspeed and pressure altitude data; step 5: determine whether the reception of the RC manual data sentence has been completed and, if so, call the closed source function to calculate and process the manual operation command of the SBUS data sentence; step 6: determine whether the preset (10 ms) flight control interval is reached and, if so, call the closed source function to execute the flight control function module; and step 7: determine whether the preset (0.5 s) flight data recording interval has been reached and, if so, call the closed source function to create and store the SD card data, and start the reception and display of the flight data downloaded to the ground station software.

Figure 3:
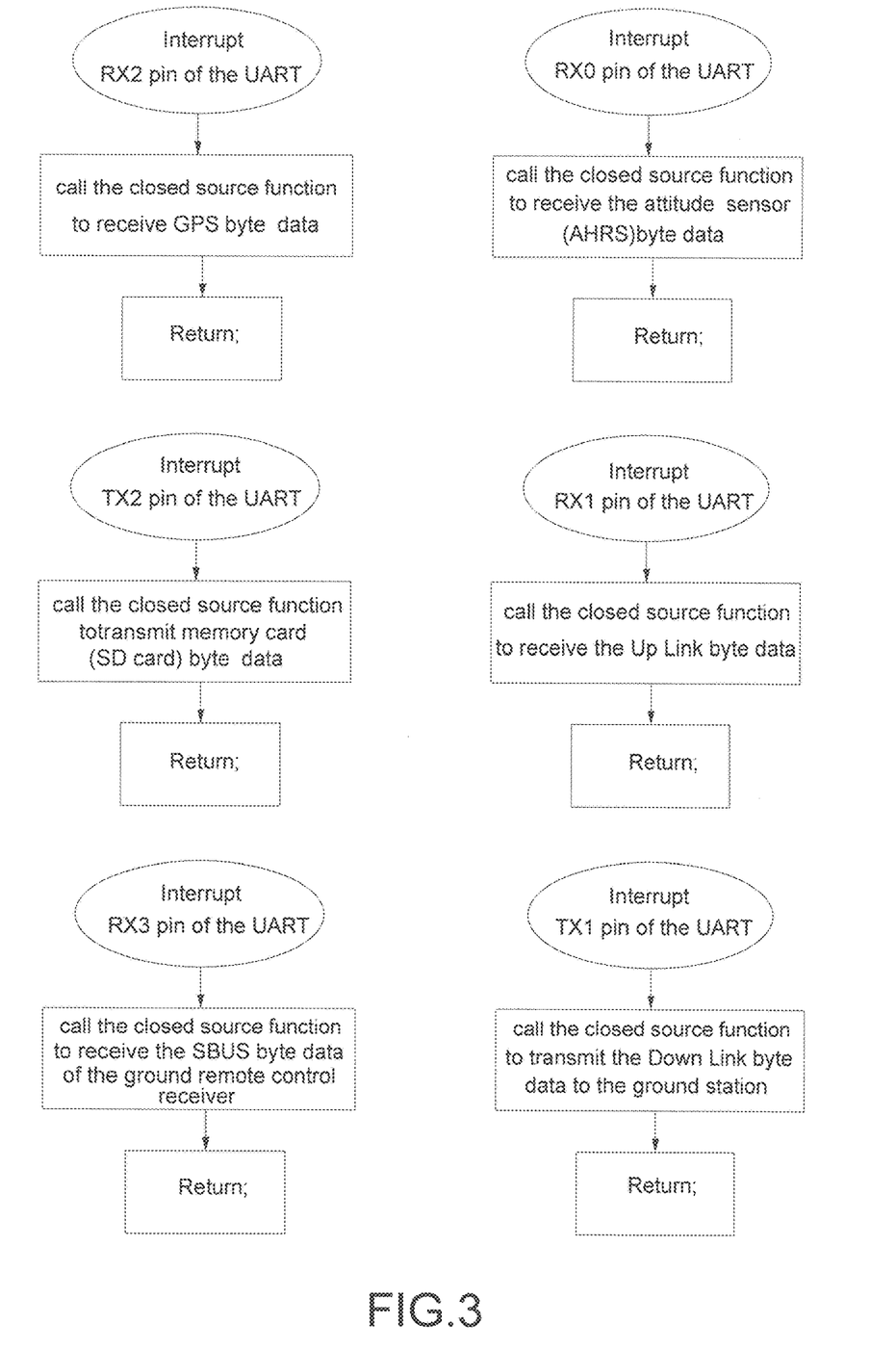
FIG. 3 is a schematic flow chart with further description in block of the semi-open source flight control module in accordance with the present invention executing a series of interrupts of real time data sending and receiving.

Referring to FIGS. 3 and 4, one embodiment mainly defines a series of interrupting steps for sending and receiving real-time data when the semi-open source control module 13 is started. The semi-open source flight control module 13 executes a series of interrupting steps for sending and receiving real-time data, which includes the following steps: step 1: interrupting the RX2 pin of the UART interface of the single-chip multi-core processor 10 and calling the closed source control function module to receive GPS byte data (GPS_Byte( )), and then return; step 2: interrupting the RX0 pin of the UART interface of the single-chip multi-core processor 10 and calling the closed source control function module to receive the attitude sensor (AHRS) byte data (AHRS_Byte( )), and then return; step 3: interrupting the TX2 pin of the UART interface of the single-chip multi-core processor 10 and calling the closed source control function module to transmit memory card (SD card) byte data (SDCard_Byte( )), and then return; step 4: interrupting the RX1 pin of the UART interface of the single-chip multi-core processor 10 and calling the closed source control function module to receive the up link byte data (UpLink_Byte( )), and then return; step 5: interrupting the RX3 pin of the UART interface of the single-chip multi-core processor and calling the closed source control function module to receive the SBUS byte data (SBUS_Byte( )) of the ground remote control receiver, and then return; and step 6: interrupting the TX1 pin of the UART interface of the single-chip multi-core processor 10 and call the closed source control function module to transmit the down link byte data (DownLink_Byte( )) to the ground station, and then return.

Referring to FIGS. 1 and 4, to achieve the second purpose of the present invention, the second embodiment mainly constructs a single-chip multi-core processor 10 and a shared register 20 on the UAV. The single-chip multi-core processor 10 comprises a main processing core 11 and multiple secondary processing cores 12. A semi-open source flight control module 13 for controlling the UAV is built in the main processing core 11; and a closed source control function module 130 and an open source control program module 131 are built in the semi-open source flight control module 13. The closed source control function module 130 at least or at most comprises a data processing function module, a communication function module, a flight control function module and a hardware setting function module, so that the semi-open source flight control module 13 is capable to perform power management, ground communication, aviation sensing, flight control, navigation calculation and information processing of flight records of the UAV. The multiple secondary processing cores 12 are respectively built with a user application program which enable the user to program working task application programs for their required task, so that the work task application programs are composed with the open source control program module 131 through the shared register 20 to respectively form a UAV flight control application program, thereby enabling the UAV flight control application program to activate the semi-open source flight control module 13 to control the UAV to complete the required task.

Referring to FIGS. 1 and 4, one embodiment mainly defines multiple secondary processing cores to assist the user in developing multiple UAV flight control application programs for their required tasks. The multiple secondary processing cores 12 are respectively built with a user application program. The user application programs of the secondary processing cores 12 respectively enable users to program the working task application programs for their required tasks, so that the working task application programs of the multiple secondary processing cores 12 are composed with the open source control program module 131 through the shared register 20 to form multiple UAV flight control application programs correspondingly, thereby enabling the UAV flight control application programs to activate the semi-open source flight control module 13 to control the flight of the UAV according to the corresponding required tasks, and so that one of the multiple UAV flight control application program performs the corresponding multiple required tasks of executions, communications and coordination of group flights, one of the multiple UAV flight control application program performs the corresponding multiple required tasks of image capture and processing, and one of the UAV flight control application program performs the corresponding multiple required tasks of payload control, data processing, and target identification, locking and tracking of the UAV.

Referring to FIG. 4, one embodiment specifically defines that the multiple secondary processing cores 12 are respectively built with an example program which is an open source program with a program code for the user to design the corresponding multiple user application programs.

One embodiment of the present invention sets the register or memory with register data areas which are applied by users for data accessing. A plurality of memories 20a are constructed on the UAV to enable the single-chip multi-core processor 10 to be informationally linked with the main processing core 11 and the secondary processing cores 12, and the plurality of memories 20a are configured to set as multiple temporary data storage areas for flight controls and commands, the multiple temporary data storage areas can be applied for data accessing when the user application program is executed.

After the detailed description of the specific embodiments mentioned above, the present invention can indeed have the following characteristics and advantages: (a) uses multi-core chip as the autopilot computing core for the UAV, builds autopilot program in the main processing core and provides shared registers storing flight status and waypoints for users to use as navigation or AI application and compution when developing the required UAV flight control application program, so as to achieve the aims of increasing the stability of system software and hardware, reducing space and weight, and reducing current consumption and cost; and (b) protect the core technology by multiple closed source control functions and partially open it for users to call when developing the user application programs for the required flight control and flight tasks of the UAV, thereby, to achieve the purpose of customizing programs and reducing the burden of designing autopilot programs for users.

While we have shown and described the embodiment in accordance with the present invention, it should be clear to those skilled in the art that further embodiments may be made without departing from the scope of the present invention.

What is claimed is:

1. A semi-open source control system for an unmanned aerial vehicle (UAV), comprising:

a single-chip multi-core processor comprising at least one main processing core and at least one secondary processing core; and at least one shared register;

wherein the at least one main processing core is built with a semi-open source flight control module which is configured to control the UAV; the semi-open source flight control module comprises a matched set of a closed source control function module and an open source control program module; the closed source control function module comprises a data processing function module, a communication function module, a flight control function module, and a hardware setting function module, and is configured to enable the semi-open source flight control module to perform power managements, ground communications, aviation sensing, flight controls, navigation calculations, and flight record information processing of the UAV; the at least one secondary processing core is built with at least one user application program enabling a user, according to at least one required task, to program at least one working task application program; and the at least one working task application program is composed with the open source control program module through the at least one shared register to form at least one UAV flight control application program which enables the semi-open source flight control module to control a flight of the UAV according to the at least one required task.

2. The semi-open source control system as claimed in claim 1, wherein the at least one shared register is built on the UAV for the single-chip multi-core processor to be informationally linked with the at least one main processing core and the at least one secondary processing core; the at least one shared register is built with a plurality of temporary data storage areas configured to store and share flight controls and commands of the UAV; the plurality of temporary data storage areas are configured to be applied by the at least one user application program as data accessing while the at least one user application program is executed; the at least one shared register comprises at least one read-only memory and at least one read-write memory; and the at least one read-only memory comprises a global positioning system (GPS) longitude temporary data storage area, a GPS latitude temporary data storage area, a GPS altitude temporary data storage area, a GPS speed temporary data storage area, attitude angle and angular velocity temporary data storage areas, an air pressure altitude temporary data storage area, temperature and airspeed temporary data storage areas, battery voltage and circuit current temporary data storage areas, and flight mode and waypoint information temporary data storage areas.

3. The semi-open source control system as claimed in claim 1, wherein the data processing function module comprises at least one processing function configured to process attitude data of attitude sensors (AHRS Sentence.o), at least one processing function configured to process GPS data (GPS Sentence.o), at least one processing function configured to process atmospheric measurement data (AIR.o), at least one processing function configured to process remote control (RC) command data (SBUS Sentence.o), at least one processing function configured to process and store flight data (SD Card Sentence.o), and at least one processing function configured to process write and read flash data (Flash.o); the communication function module comprises at least one processing function configured to process byte reception and interrupt of attitude sensor (AHRS Byte.o), at least one processing function configured to process byte reception and interrupt of RC command (SBUS_Byte.o), at least one processing function configured to process byte interrupt of flight data writing (SD Card_Byte.o), at least one processing function configured to process byte reception and interrupt of I2C interface (I2C.o), at least one processing function configured to process byte reception and interrupt of SPI interface byte (SPI.o), at least one processing function configured to process DMA interrupt (DMA.o), at least one processing function configured to process byte interrupt of communication download (DownLink Byte.o), and at least one processing function configured to process byte interrupt of communication upload (UpLink Byte.o); the flight control function module comprises at least one flight control function (Flight.o), at least one waypoint management function (WayPoint.o), at least one flight mode management function (Mode.o), and at least one processing function configured to convert control volume into server PWM signal (PWM.o); and the hardware setting function module comprises at least one serial interface initialization function (iniUART.o), at least one I2C interface initialization function (iniI2C.o), at least one SPI interface initialization function (iniSPI.o), at least one direct memory access initialization function (iniDMA.o), at least one PWM output initialization function (iniPWM.o), at least one A/D conversion initialization function (iniADC.o), at least one timer initialization function (iniTimer.o), and at least one port pin initialization function (iniPort.o).

4. The semi-open source control system as claimed in claim 1, wherein numbers of the at least one secondary processing core, the at least one user application program, the at least one required task, the at least one working task application program, and the at least one UAV flight control application program are multiple respectively; the multiple secondary processing cores are built with the multiple user application programs correspondingly; and the multiple user application programs built in the multiple secondary processing cores correspondingly enable the user, according to the multiple required tasks, to program the multiple working task application programs which are correspondingly composed with the open source control program module to form the multiple UAV flight control application programs through the at least one shared register, so that the semi-open source flight control module is capable to control the flight of the UAV according to the multiple required tasks, and so that one of the multiple UAV flight control application programs performs multiple required tasks of executions, communications, and coordination of group flights, one of the multiple UAV flight control application programs performs multiple required tasks of image capture and processing, and one of the multiple UAV flight control application programs performs multiple required tasks of payload control, data processing, and target identification, locking, and tracking of the UAV.

5. The semi-open source control system as claimed in claim 1, wherein the semi-open source flight control module is configured to perform a series of interrupts of real time data sending and receiving, comprising steps of:
(a) interrupting an RX2 pin of a Universal Asynchronous Receiver/Transmitter (UART) interface of the single-chip multi-core processor and calling the closed source control function module to receive GPS byte data, and then return;
(b) interrupting an RX0 pin of the UART interface of the single-chip multi-core processor and calling the closed source control function module to receive attitude sensor (AHRS) byte data, and then return;
(c) interrupting a TX2 pin of the UART interface of the single-chip multi-core processor and calling the closed source control function module to transmit SD card byte data, and then return;
(d) interrupting an RX1 pin of the UART interface of the single-chip multi-core processor and calling the closed source control function module to receive Up Link byte data, and then return;
(e) interrupting an RX3 pin of the UART interface of the single-chip multi-core processor and calling the closed source control function module to receive SBUS byte data of a ground remote control receiver, and then return; and
(f) interrupting a TX1 pin of the UART interface of the single-chip multi-core processor and calling the closed source control function module to transmit Down Link byte data to a ground station, and then return.

6. The semi-open source control system as claimed in claim 5, wherein the open source control program module of the semi-open source flight control module executes steps of:
(a) calling the closed source control function module in sequence to initialize a complex hardware setting function module;
(b) determining whether an attitude data sentence has been received and, if so, calling the closed source control function module to calculate and process the attitude data sentence;
(c) determining whether reception of a GPS data sentence has been completed and, if so, calling the closed source control function module to calculate and process the GPS data sentence;
(d) determining whether a static pressure and dynamic pressure sampling is completed and, if so, calling the closed source control function module to calculate and process airspeed and pressure altitude data;
(e) determining whether reception of a remote control (RC) manual data sentence has been completed and, if so, calling the closed source control function module to calculate and process a manual operation command of an SBUS data sentence;
(f) determining whether a preset flight control interval is reached and, if so, calling the closed source control function module to execute the flight control function module; and
(g) determining whether a preset flight data recording interval has been reached and, if so, calling the closed source control function module to create and store SD card data, and start reception and display of the preset flight data downloaded to a ground station software.

7. A design method for the semi-open source control system as claimed in claim 1, comprising steps of:
constructing a single-chip multi-core processor and at least one shared register on a UAV, wherein the single-chip multi-core processor comprises at least one main processing core and at least one secondary processing core;
building a semi-open source flight control module in the at least one main processing core, wherein the semi-open source flight control module is configured to control the UAV;
building a closed source control function module and an open source control program module in the semi-open source flight control module;
building a data processing function module, a communication function module, a flight control function module, and a hardware setting function module in the closed source control function module configured to enable the semi-open source flight control module to perform power management, ground communication, aviation sensing, flight control, navigation algorithm, and flight record information processing of the UAV; and building at least one user application program in the at least one secondary processing core; wherein the at least one user application program enables a user, according to at least one required task, to program at least one working task application program which is composed with the open source control program module through the at least one shared register to form at least one UAV flight control application program; and the at least one UAV flight control application program enables the semi-open source flight control module to control the flight of the UAV according to the at least one required task.

8. The design method as claimed in claim 7, wherein the at least one shared register is built on the UAV for the single-chip multi-core processor to be informationally linked with the at least one main processing core and the at least one secondary processing core; the at least one shared register is built with a plurality of temporary data storage areas configured to store and share flight controls and commands of the UAV; the plurality of temporary data storage areas are configured to be applied by the at least one user application program as data accessing while the at least one user application program is executed; the at least one shared register comprises at least one read-only memory and at least one read-write memory; and the at least one read-only memory comprises a global positioning system (GPS) longitude temporary data storage area, a GPS latitude temporary data storage area, a GPS altitude temporary data storage area, a GPS speed temporary data storage area, attitude angle and angular velocity temporary data storage areas, an air pressure altitude temporary data storage area, temperature and airspeed temporary data storage areas, battery voltage and circuit current temporary data storage areas, and flight mode and waypoint information temporary data storage areas.

9. The design method as claimed in claim 7, wherein the data processing function module comprises at least one processing function configured to process attitude data of attitude sensors (AHRS Sentence.o), at least one processing function configured to process GPS data (GPS Sentence.o), at least one processing function configured to process atmospheric measurement data (AIR.o), at least one processing function configured to process remote control (RC) command data (SBUS Sentence.o), at least one processing function configured to process generating and storing flight data (SD Card Sentence.o), and at least one processing function configured to process write and read flash data (Flash.o); the communication function module comprises at least one processing function configured to process byte reception and interrupt of attitude sensor (AHRS Byte.o), at least one processing function configured to process byte reception and interrupt of RC remote control command (SBUS_Byte.o), at least one processing function configured to process byte interrupt of flight data writing (SD Card_Byte.o), at least one processing function configured to process byte reception and interrupt of I2C interface (I2C.o), at least one processing function configured to process byte reception and interrupt of SPI interface byte (SPI.o), at least one processing function configured to process DMA interrupt (DMA.o), at least one processing function configured to process byte interrupt of communication download (DownLink Byte.o) and at least one processing function configured to process byte interrupt of communication upload (UpLink Byte.o); the flight control function module comprises at least one flight control function (Flight.o), at least one waypoint management function (WayPoint.o), at least one flight mode management function (Mode.o), and at least one processing function configured to convert control volume into server PWM signal (PWM.o); and the hardware setting function module comprises at least one serial interface initialization function (iniUART.o), at least one I2C interface initialization function (iniI2C.o), at least one SPI interface initialization function (iniSPI.o), at least one direct memory access initialization function (iniDMA.o), at least one PWM output initialization function (iniPWM.o), at least one A/D conversion initialization function (iniADC.o), at least one timer initialization function (iniTimer.o), and at least one port pin initialization function (iniPort.o).

10. The design method as claimed in claim 7, wherein numbers of the at least one secondary processing core, the at least one user application program, the at least one required task, the at least one working task application program, and the at least one UAV flight control application program are multiple respectively; the multiple secondary processing cores are built with the multiple user application programs correspondingly; and the multiple user application programs built in the multiple secondary processing cores correspondingly enable the user, according to the multiple required tasks, to program the multiple working task application programs which are correspondingly composed with the open source control program module to form the multiple UAV flight control application programs through the at least one shared register, so that the semi-open source flight control module is capable to control the flight of the UAV according to the required tasks, and so that one of the multiple UAV flight control application programs performs multiple required tasks of executions, communications, and coordination of group flights, one of the multiple UAV flight control application programs performs multiple required tasks of image capture and processing, and one of the multiple UAV flight control application programs performs multiple required tasks of payload control, data processing, and target identification, locking, and tracking of the UAV.

11. The design method as claimed in claim 10, wherein the multiple secondary processing cores are respectively built with an example program which is an open source program with program code for the user to design the multiple user application programs.

* * * * *